W. ARRONQUIER.
Hard-Finished Surfaces
No. 155,632.  Patented Oct. 6, 1874.

UNITED STATES PATENT OFFICE.

WILLIAM ARRONQUIER, OF WORCESTER, MASSACHUSETTS.

IMPROVEMENT IN MAKING HARD-FINISHED SURFACES.

Specification forming part of Letters Patent No. 155,632, dated October 6, 1874; application filed June 26, 1874.

*To all whom it may concern:*

Be it known that I, WILLIAM ARRONQUIER, of the city and county of Worcester and Commonwealth of Massachusetts, have invented certain new and useful Improvements in Making Hard-Finished Surfaces from Lime, to be used in finishing plastered surfaces of rooms, and for making blackboards to be written upon, and for other purposes; and I do hereby declare that the following is a full, clear, and exact description of the same, reference being had to the accompanying drawing forming a part of this specification, and in which the figure represents a section of the plastering of a room having my improved hard lime-finished surface applied thereto.

To enable those skilled in the art to make and use my said invention, I will describe it more in detail.

In applying my said hard lime-finished surface to plastered walls and ceilings of buildings, the operation is as follows:

The walls are lathed and plastered the same as usual preparatory to applying the common hard finish; but in lieu of that I first take common lime, of good quality, and slake it with water in the ordinary way, and when the lime is at the boiling-point I mix with it about five per cent. of pulverized alum, which is to be well stirred in, and the whole, while in a liquid or semi-liquid state, is then turned or run through a fine sieve, for the purpose of more effectually disintegrating and slaking the lime, mixing it with the alum, and separating from the whole mass any bunches or foreign substance which it may contain.

The material thus prepared is placed in or upon suitable receptacles, and dried by the action of the sun or by artificial means, after which it is ground or pulverized by suitable mechanism, and is afterward used as follows:

It is mixed up with water to the consistency of thin putty, and is then mixed with common lime, also slaked to the consistency of thin putty, in the proportions of three parts of the former to one part of the latter, after which the material thus prepared is applied to the plastered wall and ceiling of the building without any other admixture, the application being made to the plastered surfaces in the usual way, and when it is to be finished with a hard, dead appearance, it is rubbed smooth by means of a trowel and water; but if it is desired to have the surface finished with a bright and glistening appearance, it is rubbed smooth with a trowel and glue or gum-arabic water.

The great advantages due to my invention are, that the finish can be quickly made, will not crack, and, besides, grows hard by age, so much so that in a short time it has a hardness resembling that of flint. Then again, water will not discolor or cause it to turn, or otherwise affect it.

A surface thus finished, among its several uses, forms a useful basis for blackboards.

Having described my invention or improvements in the mode or process of producing hard-finished lime surfaces, what I claim therein as new, and desire to secure by Letters Patent, is—

The mode or process herein described of producing a hard lime finish by a mixture of lime and alum, slaked and powdered, and then mixed with slaked lime in the proportions above described, and applied to the surface or surfaces to be finished, substantially as and for the purposes set forth.

WILLIAM ARRONQUIER.

Witnesses:
THOS. H. DODGE,
EDWIN E. MOORE.